June 26, 1962 V. T. LEVEY 3,040,463
FISHING POLE AND REEL COMBINATION
Filed March 3, 1961
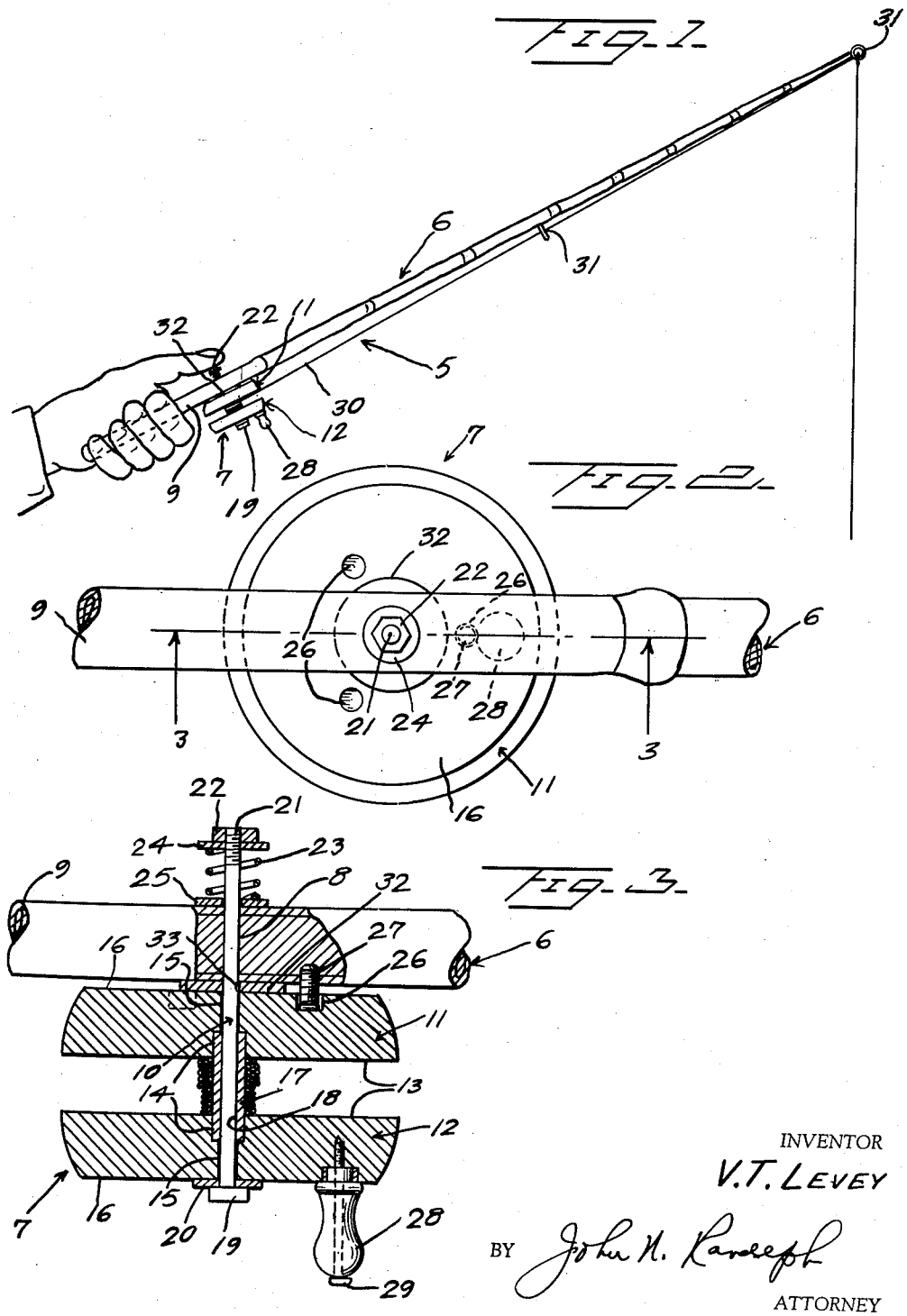
INVENTOR
V.T. LEVEY
BY John H. Randolph
ATTORNEY 3,040,463
FISHING POLE AND REEL COMBINATION
Virginius T. Levey, Crossett, Ark.
(1504 W. 25th St., Pine Bluff, Ark.)
Filed Mar. 3, 1961, Ser. No. 93,176
6 Claims. (Cl. 43—20)

This invention relates to a novel combination of fishing pole and reel of extremely simple construction including novel means for automatically locking the reel against rotation and which locking means is releasable, to permit rotation of the reel, by a pressure applied by a part of the hand which grips the fishing pole for supporting the pole and reel.

Still a further object of the invention is to provide a fishing pole and reel combination which may be very economically manufactured and sold, yet which will be extremely efficient and durable for its intended purpose.

Various other objects and advantages of the invention will hereinafter become more fully apparent from the following description of the drawing, illustrating a presently preferred embodiment thereof, and wherein:

FIGURE 1 is a side elevational view of the fishing pole and reel;

FIGURE 2 is an enlarged fragmentary plan view of a portion of the combination, as seen in FIGURE 1, and viewed from above, and FIGURE 3 is a sectional view, partly in elevation, taken substantially along a plane as indicated by the line 3—3 of FIGURE 2.

Referring more specifically to the drawing, the fishing pole and reel combination, comprising the invention, is designated generally 5 and includes an elongated fishing pole 6 and a fishing reel 7.

As seen in FIGURE 3, a bore 8 is formed diametrically through the fishing pole 6 adjacent its handle end 9 and remote from the other end of the pole 6. A long screw 10 has a portion which extends slidably through the bore 8, as best seen in FIGURE 3.

The fishing reel 7 includes two relatively thick disc-shaped side members 11 and 12 having substantially flat inner faces 13 and centrally disposed bores each including an inner portion 14 and an outer portion 15. The inner bore portions 14 are of larger diameter than the outer bore portions 15 and said inner portions open through the inner faces 13, while the outer bore portions 15 open through the outer faces 16 of the side members 11 and 12. The ends of a rigid sleeve or tube 17 are secured by a press fit engagement or in any other conventional manner in the aligned bore portions 14 to form a hub for the reel 7 and to connect the side members 11 and 12 in spaced apart substantially parallel relation to one another. A part of the shaft 10 extends through the outer bore portions 15 and the bore 18 of the sleeve 17, and is turnably engaged thereby to provide a journal for the reel 7. The bore portions 15 are preferably slightly larger than the bore 18 so that the reel 7 is rotatably mounted on the shaft 10 by engagement of the hub 17 therewith.

The shaft 10 has a head 19. A washer 20 is disposed on the shaft 10 between the head 19 and the outer side member 12 of the reel, and said washer 20 bears against a part of the flat outer side 16 of said side member 12. The shaft 10 is of a length substantially greater than the combined thickness of the reel 7 and pole 6, and is provided with a threaded opposite end 21 on which is mounted a nut 22. The nut 22 is normally spaced outwardly from the end of the bore 8 which is disposed remote from the reel 7. A coiled compression spring 23 is mounted on the shaft 10 between the pole 6 and nut 22. A washer 24 is disposed between the nut 22 and one end of the spring 23, and a second washer 25 is disposed between the other end of the spring 23 and the pole 6.

A washer 32 is secured, as by welding, as seen at 33, to the shaft 10 and is disposed between the reel side 11 and pole 6 to maintain the reel 7 out of contact with the pole 6. Washer 32 is spaced a sufficient distance from the head 19 so that the reel 7 can rotate freely on shaft 10 between washers 20 and 32, and will move with said shaft relative to the pole 6, as hereinafter described.

As seen in FIGURES 2 and 3, the outer side 16 of the inner side member 11 is provided with a plurality of outwardly opening corresponding sockets 26 which are spaced equal distances from the axis of the reel 7 and beyond the periphery of the washer 32, three such sockets 26 being shown. A detent element 27 is anchored in and projects from the pole 6 toward the reel 7 and has its axis disposed parallel to the axis of the bore 8 and spaced a distance therefrom corresponding to the spacing between the reel axis and sockets 26. The detent 27 is shown as a screw and the part thereof which protrudes from the pole 6 is of a size to be received detachably in any one of the sockets 26.

A knob or handle 28 is rotatably mounted on a headed screw 29 which is anchored in and projects outwardly from the outer side 16 of the outer reel member 12, so that the knob or handle 28 is radially spaced from the reel axis 10 and is mounted to rotate freely relative to the remainder of the reel.

A fishing line 30 is wound on the reel hub 17 between the adjacent faces 13 of the side members 11 and 12 and has one end extending from said reel slidably through conventional line guides 31 of the pole 6.

The pole 6 is normally held, as seen in FIGURE 1, by the user grasping the handle 9. When it is desired to turn the reel 7, for winding in the line 30, pressure is applied with the thumb, of the hand grasping the handle 9, against the nut 22, for displacing the shaft 10 downwardly through the bore 8, so that the reel 7 is displaced by the washer 32 away from the pole or rod 6, to thus disengage the reel side member 11 from the detent 27, so that the reel can be revolved by grasping the knob 28 and while pressure is maintained on the nut 22. In the same manner, the reel 7 can be held disengaged from the detent 27 for casting. When pressure is released on the nut 22, the spring 23 will displace the shaft 10 and reel 7 upwardly toward the pole 6 and so that the detent 27 will be received in one of the sockets 26 as the reel is turned, for thus automatically locking the reel nonrotatably to the pole.

Various modifications and changes are contemplated and may be resorted to, without departing from the function or scope of the invention as hereinafter defined by the appended claims.

I claim as my invention:

1. A fishing pole and reel combination comprising a fishing pole, a fishing reel, a shaft on which said reel is journaled, said pole having a diametrical bore through which a part of the shaft slidably extends for rotatably connecting the reel to the pole, and spring means bearing against a part of the pole and a part of said shaft for urging the shaft in one direction through said bore for displacing the reel toward the pole, said shaft part being manually engageable for displacing the shaft in the opposite direction through said bore for moving the reel laterally away from the pole.

2. A fishing pole and reel combination as in claim 1, and means interlocking the reel to the pole when the shaft and reel are moved in said first mentioned direction by said spring means.

3. A fishing pole and reel combination as in claim 2, said means interlocking the reel to the pole including a detent element fixed to and projecting laterally from the pole and a socket formed in said reel and disposed to receive a part of said detent element in one position of rotation of the reel.

4. A fishing pole and reel combination as in claim 1, said reel including relatively thick disc-shaped side members and a tubular hub member extending between and anchored to said side members, said hub member being rotatably mounted on a part of said shaft.

5. A fishing pole and reel combination as in claim 1, and means carried by the shaft for retaining the shaft against sliding movement relative to the reel.

6. A fishing pole and reel combination comprising a fishing pole having a diametrical bore, a fishing reel, a shaft, means rotatably confining the reel on one end of the shaft for mounting the reel directly on the shaft, the other end of the shaft engaging slidably through the bore for mounting the shaft directly on the pole, spring means carried by said last mentioned shaft end and bearing against a part thereof and a part of the pole for urging the shaft end in one direction through said bore for displacing the reel toward the pole, said shaft part being manually engageable for displacing the shaft in the opposite direction through said bore for moving the reel laterally away from the pole, and means interlocking the reel to the pole when the reel is moved with the shaft in said first mentioned direction by said spring means, said last mentioned means including a fixed part supported by the pole and a part carried by the reel in which said fixed part is received.

References Cited in the file of this patent
UNITED STATES PATENTS

| | | |
|---|---|---|
| 96,652 | Altmaeir | Nov. 9, 1869 |
| 485,208 | Mount | Nov. 1, 1892 |
| 1,444,154 | Jenks | Feb. 6, 1923 |
| 2,409,098 | Benson | Oct. 8, 1946 |
| 2,753,645 | Wood | July 10, 1956 |